(12) United States Patent
Yoshimura et al.

(10) Patent No.: US 8,097,692 B2
(45) Date of Patent: Jan. 17, 2012

(54) PURIFICATION METHOD OF HIGH-MOLECULAR-WEIGHT POLYOXYALKYLENE DERIVATIVE

(75) Inventors: Shuichi Yoshimura, Kanagawa (JP); Ken-ichiro Nakamoto, Kanagawa (JP); Chika Itoh, Kawasaki (JP)

(73) Assignee: NOF Corporation, Tokyo (JP)

( * ) Notice: Subject to any disclaimer, the term of this patent is extended or adjusted under 35 U.S.C. 154(b) by 108 days.

(21) Appl. No.: 12/750,842

(22) Filed: Mar. 31, 2010

(65) Prior Publication Data

US 2010/0286361 A1 Nov. 11, 2010

(30) Foreign Application Priority Data

Mar. 31, 2009 (JP) ................................. 2009-085124

(51) Int. Cl.
*C08G 63/02* (2006.01)
(52) U.S. Cl. ......... 528/313; 526/262; 526/285; 526/322
(58) Field of Classification Search .................. 526/262, 526/285, 322; 528/313
See application file for complete search history.

(56) References Cited

U.S. PATENT DOCUMENTS

| | | | |
|---|---|---|---|
| 5,298,410 | A | 3/1994 | Phillips et al. |
| 2002/0120075 | A1 | 8/2002 | Yasukohchi et al. |
| 2006/0074200 | A1 | 4/2006 | Daugs |

FOREIGN PATENT DOCUMENTS

| | | |
|---|---|---|
| JP | 3-135931 A | 6/1991 |
| JP | 9-100250 A | 4/1997 |
| JP | 11-263834 A | 9/1999 |
| JP | 11-335460 A | 12/1999 |
| JP | 2006-63313 A | 3/2006 |
| JP | 2006-188611 A | 7/2006 |
| JP | 2007-501325 A | 1/2007 |
| JP | 2008-511729 A | 4/2008 |
| JP | 2008-514693 A | 5/2008 |
| WO | 2004/101470 A2 | 11/2004 |
| WO | 2006/028745 A1 | 3/2006 |
| WO | 2007/024066 A1 | 3/2007 |

OTHER PUBLICATIONS

M. Leonard et al., "Synthesis and characterization of a polyoxyethylene derivative for the affinity labeling of human hemoglobin," Makromol. Chem., vol. 189, pp. 1809-1817 (1988).

G. Lapienis et al., "Preparation of Monomethyl Ethers of Poly(ethylene glycol)s Free of the Poly(ethylene glycol)," Journal of Bioactive and Compatible Polymers, vol. 16, pp. 206-220 (2001).

*Primary Examiner* — Terressa Boykin
(74) *Attorney, Agent, or Firm* — Sughrue Mion, PLLC

(57) ABSTRACT

A purification method in which, from a specific polyoxyalkylene derivative having a molecular weight of 8,800 to 100,000, an impurity differing in the number of hydroxyl groups is separated, the method including steps (A), (B), (C), and (D). Step (A): a step in which an aprotic organic solvent is used in an amount at least 5 times by weight the amount of the polyoxyalkylene derivative to dissolve the polyoxyalkylene derivative therein and give a solution; step (B): a step in which an adsorbent comprising an oxide containing at least one of aluminum and silicon is added to the solution in an amount 0.5 to 5 times by weight the amount of the polyoxyalkylene derivative to thereby yield a slurry; step (C): a step in which the slurry is stirred at 25° C. or higher; step (D): a step in which the polyoxyalkylene derivative is recovered from the slurry.

16 Claims, 1 Drawing Sheet

PURIFICATION METHOD OF HIGH-MOLECULAR-WEIGHT POLYOXYALKYLENE DERIVATIVE

TECHNICAL FIELD

The present invention relates to a method of purifying a polyoxyalkylene derivative having a high molecular weight.

BACKGROUND ART

In recent years, polyoxyalkylene derivatives are used in extremely large field as materials for imparting the long circulation property in the blood, the function of targeting a target site, etc. to polypeptides, enzymes, antibodies, nucleic acid compounds including genes and oligonucleic acids, nucleic acid medicines, and other physiologically active substances. This is because polyoxyalkylene derivatives show a weak interaction with other living-body components due to the steric repulsion effect. It is known that physiologically active substances modified with polyoxyalkylene derivatives or drug carriers obtained by modifying liposomes or the like with polyoxyalkylene derivatives exhibit the long circulation property in the internal blood for a longer period than the unmodified ones. It has been reported that the higher the molecular weight of the polyoxyalkylene derivatives, the higher the effect. Furthermore, by combining an active group or an antibody with an end of such a polyoxyalkylene derivative, a targeting function can also be imparted. In the field of drug delivery systems, polyoxyalkylene derivatives have become an exceedingly useful and indispensable material. Because of this, there is a desire for a polyoxyalkylene derivative which has a higher purity and a low impurity content, from the standpoints of the performance and safety of drugs to be produced using the derivative. Polyoxyalkylene derivatives having various frameworks have been developed so far, and various impurities generate as by-products depending on the methods of production. Examples thereof are shown below.

(Case A: Diol Impurity in One-End-Blocked Linear Polyoxyalkylene Derivative)

Examples thereof first include the impurities called diols that are polyoxyalkylene derivatives terminated at each of both ends by a hydroxyl group and are contained in linear polyoxyalkylene derivatives having one hydroxyl group, which are the most widely used polyoxyalkylene derivatives.

When a polyoxyalkylene derivative having one hydroxyl group is to be produced, the derivative can be obtained usually by addition-polymerizing an alkylene oxide using a corresponding alcohol as an initiator and further using an alkali catalyst. In this process, when the alkylene oxide undergoes addition polymerization with water which has come into the initiator alcohol or remains in the reaction tank or with an impurity having hydroxyl groups at both ends which has been formed by decomposition of the initiator, then the alkylene oxide addition-polymerizes with each end to produce as a by-product a diol having a molecular weight which is two times the molecular weight of the main component. Since a large amount of an alkylene oxide is addition-polymerized in producing a polyoxyalkylene derivative having a high molecular weight, the amount of the initiator becomes small for the reaction vessel. As a result, the number of moles of the water in the system becomes too large relative to the initiator and, hence, the high-molecular-weight polyoxyalkylene has an increased diol content. Furthermore, the higher the molecular weight of polyoxyalkylene derivatives, the higher the melt viscosity thereof. There are hence cases where a solvent is added in the course of the addition polymerization of an alkylene oxide to lower the viscosity, or where the catalyst is supplemented in order to heighten the rate of reaction. There also are diols which generate due to the addition polymerization of the alkylene oxide with the water contained in a slight amount in those ingredients, and such diols have various molecular weights depending on the production methods. There are even cases where diols having a molecular weight which is approximately equal to or lower than that of the main component generate.

Since diols generate even when water is present in an exceedingly slight amount as stated above, it is difficult to completely inhibit the generation of such by-products. In particular, the inhibition is more difficult in the production of high-molecular-weight polyoxyalkylene derivatives, which are considered to be effective in the field of drug carriers. Such an impurity diol is causative of drug dimerization when used for drug modification. The diols are polyether compounds like the desired products, and separation and purification are difficult. Because of this, there is a strong desire for a purification technique for diminishing the diols contained in polyoxyalkylene derivatives.

(Cases B and E: Impurity in Polyoxyalkylene Derivative of Branched Type Formed After Polymerization)

One method for producing a branched polyoxyalkylene derivative having polyoxyalkylene chains in a number which is an integer of 2 or larger is a method in which a reactive polyoxyalkylene derivative is chemically combined with a compound serving as a framework and having active-hydrogen groups.

Impurities which result as by-products from this method include the reactive polyoxyalkylene derivative, the polyoxyalkylene derivative formed through hydrolysis of the reactive polyoxyalkylene derivative and resultant return of the reactive part to a hydroxyl group, the unreacted starting material, and a reaction intermediate formed by introducing only one polyoxyalkylene chain into the starting material. Examples thereof further include the diol originally contained in the reactive polyoxyalkylene derivative. The synthesis of a branched polyoxyalkylene derivative by this method results in production of impurities having various functional groups and molecular weights, and purification is especially difficult. Such a branched polyoxyalkylene derivative modifies a physiologically active substance through few bonding sites and enables the modified substance to exhibit the same property of remaining in the blood as that modified with a linear derivative. Because of the small number of bonding sites, the branched polyoxyalkylene derivative is exceedingly effective in preventing the activity of the physiological active substance itself from decreasing. There has hence been a desire for a purification technique for removing linear polyoxyalkylene derivatives.

(Case D: Diol Impurity in Multibranched Polyoxyalkylene Derivative)

With respect to branched polyoxyalkylene derivatives having three or more hydroxyl-terminated polyoxyalkylene chains and obtained by addition-polymerizing an alkylene oxide using a polyhydric alcohol such as, for example, glycerol or diglycerol as an initiator, examples of impurities include diols derived from water contained in the initiator, as in the case of linear polyoxyalkylene derivatives having one hydroxyl group. Examples thereof further include diols derived from water contained in solvents, because some initiators which are solid or have high viscosity are dissolved in organic solvents before being used for the reaction. There also are diols which generate as by-products due to solvent addition or catalyst supplementation during the reaction, as in the case described above. Since the polyhydric alcohol as the main component has a larger number of hydroxyl groups and has a larger number of moles of the alkylene oxide added per mole, those by-product diols have a molecular weight which is equal to or lower than that of the main component. Such polyfunctional polyoxyalkylene derivatives are in use as a hemostatic agent for surgical operations, etc. in the field of medicines and as a raw material for gelling agents such as sealing agents. In case where an impurity derived from a diol comes into the polyfunctional polyoxyalkylene derivative, this means that an impurity differing in molecular weight or crosslinking site enters and a desired gel strength cannot be obtained. As incase A, water removal in the stage of synthesis is exceedingly difficult and there is a strong desire for a purification technique for diminishing diols contained in a polyoxyalkylene derivative.

(Case C: Impurity Having Unreacted Hydroxyl Group resulting from Functional Group Conversion)

The polyoxyalkylene derivatives synthesized by the methods described above are thereafter subjected to chemical modification through conversion of the terminal hydroxyl groups to various functional groups. Usually, the higher the molecular weight of the polyoxyalkylene derivative, the higher the viscosity and the lower the concentration of reactive parts in the molecule. Such a polyoxyalkylene derivative has impaired conversion and, hence, hydroxyl groups remain in a small amount. Furthermore, in the case of a polyoxyalkylene derivative having a large number of hydroxyl groups in the molecule as in case D, impurities differing in the number of unreacted hydroxyl groups generate during the chemical modification, the number of kinds of such impurities being 2 or a larger integer. From the standpoints of purity improvement and yield improvement, it has become important to diminish polyoxyalkylene derivatives having unreacted hydroxyl groups.

When unreacted hydroxyl groups thus remain, the polyoxyalkylene derivative has a reduced purity and gives a drug which also has a reduced purity. There has hence been a desire for a technique for purifying a polyoxyalkylene derivative.

Various impurities generate as by-products in the synthesis of polyoxyalkylene derivatives as described above, and various proposals have been made on methods for purifying the derivatives. In particular, with respect to the purification of a polyoxyalkylene derivative having one hydroxyl group by removing the diol therefrom, the following methods have been proposed.

(Example of Purification Method for One-End-Oh Derivative: Water Content Control During Alkylene Oxide Addition)

One method is a production method used in the addition polymerization of an alkylene oxide. As shown in patent document 1 (JP-A-11-335460) and patent document 2 (US 2006/0074200), the content of water in the system in the addition reaction of ethylene oxide using an alcohol compound as a starting material is controlled on the order of ppm, and the influence of water molecules, which are causative of the diol as an impurity having a higher molecular weight, is thereby minimized to inhibit the diol from generating. However, since a large amount of an alkylene oxide is addition-polymerized in producing a polyoxyalkylene derivative having a high molecular weight, the amount of the initiator becomes small for the reaction vessel. As a result, the number of moles of the water in the system becomes too large relative to the initiator and, hence, the high-molecular-weight polyoxyalkylene has an increased diol content. The generation of the diol as a by-product is therefore unavoidable.

(Example of Purification Method for One-End-OH Derivative: Chromatographic Purification)

Among methods proposed as techniques for removing a diol generated, there is a method in which purification and separation are implemented based on molecular weight, as in the experiment on methoxypolyethylene glycol purification through dialysis reported in non-patent document 1 (Leonard et al., *Macromol. Chem.*, 189, 1809-1817 (1988)). However, the diol having a molecular weight equal or close to that of the main component is difficult to separate by purification through dialysis.

In the experiment on methoxypolyethylene glycol purification through column chromatography with silica gel reported in non-patent document 2 (Lapienis et al., *J. Bioactive Compatible Polymers*, 16, 206-220 (2001)), about tens of grams of a methoxypolyethylene glycol having a molecular weight of 5,000 or lower was subjected to removal of the diol therefrom on a laboratory level. However, the amounts of the silica gel and solvent to be used are both exceedingly large as compared with the amount of the methoxypolyethylene glycol to be purified, and production on an industrial scale is difficult. Furthermore, the compounds having an increased molecular weight have reduced polarity per molecule and are hence difficult to separate. In addition, the rate of elution varies depending on molecular weight, and affects separability. It is therefore necessary for isolating a desired compound by column chromatography that a packing material and an eluent should be selected according to the kind and content of the impurity. It is also necessary to optimize conditions for development. As described above, purification through column chromatography necessitates use of large amounts of an adsorbent and a solvent and the operation is exceedingly complicated. Purification by this method is impossible depending on the molecular weight of the desired polyoxyalkylene derivative and on the impurity contained therein.

Furthermore, patent document 3 (U.S. Pat. No. 5,298,410) and patent document 4 (JP-T-2008-514693; the term "JP-T" as used herein means a published Japanese translation of a PCT patent application) disclose a method in which the hydroxyl group of a methoxypolyethylene glycol is modified with a dimethyltrityl group, acetic ester group, or phthalic ester group to enhance a difference in polarity and the modified compound is isolated by column chromatography. However, this production method necessitates temporarily chemically modifying the terminal hydroxyl group, subjecting this compound to column purification and then to deprotection, and thereafter returning the modified group to a hydroxyl group. There are hence problems that the steps are exceedingly complicated and that impurities of a new chemical species generate due to the chemical modification. In addition, it is thought that polyethylene glycol derivatives having a higher molecular weight, in particular, have a reduced difference in terminal polarity and this makes separation difficult.

(Example of Purification Method for One-End-OH Derivative: Batch Treatment with Ion-Exchange Resin)

Meanwhile, patent document 5 (WO 2006/028745) shows an example in which a methoxypolyethylene glycol, without being chemically modified, is caused to act on an ion-exchange resin formed from a polycarboxylic acid and the diol is thereby adsorbed and removed. There is a statement therein to the effect that this technique is a purification method effective also for the high-molecular-weight compound having a molecular weight of 30,000. However, the principle of this adsorption is separation for which an interaction between ether oxygen atoms in the polyethylene glycol molecule and the carboxylic acid within the resin is utilized and which is also based on a difference in molecular weight. Because of this, the purification method is not applicable to cases where the molecular weight of the diol is equal or close to the molecular weight of the methoxypolyethylene glycol.

It can be seen from the above explanations that it is difficult to remove a high-molecular-weight diol from a high-molecular-weight polyoxyalkylene derivative having a hydroxyl group at one end and that it is technically difficult to remove diols having a molecular weight not higher than the molecular weight of the main component.

[Prior-Art Documents]
[Patent Documents]
  [Patent Document 1] JP-A-11-335460
  [Patent Document 2] US 2006/0074200
  [Patent Document 3] U.S. Pat. No. 5,298,410
  [Patent Document 4] JP-T-2008-514693
  [Patent Document 5] WO 2006/028745
[Non-Patent Documents]
  [Non-Patent Document 1] Leonard et al., *Macromol. Chem.*, 189, 1809-1817 (1988)
  [Non-Patent Document 2] Lapienis et al., *J. Bioactive Compatible Polymers*, 16, 206-220 (2001)

SUMMARY OF THE INVENTION

Problems that the Invention is to Solve

An object of the invention is to provide a method for producing a polyoxyalkylene derivative having a high purity and a high molecular weight by diminishing an impurity contained in the main component, which has the different number of hydroxyl groups per molecule.

Means for Solving the Problems

The present inventors diligently made investigations in order to overcome the problems. As a result, they have succeeded in obtaining a purification method in which when high-molecular-weight polyoxyalkylene derivatives are subjected to an adsorption operation in an aprotic organic solvent using an inorganic adsorbent constituted of an oxide containing at least one of aluminum and silicon, then the derivatives can be separated, irrespective of the molecular weights thereof, according to a difference in the number of hydroxyl groups contained in the molecule and a polyoxyalkylene derivative having a high purity and a high molecular weight can be obtained. According to the invention, a polyoxyalkylene derivative can be extremely easily purified by merely using a mode in which an adsorbent, like a filtration aid, is brought, from the beginning, into the state of being mixed with a solution containing the derivative dissolved therein and is filtered off, without performing column chromatography.

ADVANTAGES OF THE INVENTION

According to the invention, purification to a high purity is possible on the basis of a difference in the number of hydroxyl groups, regardless of the molecular weight of the desired compound, molecular weight and structure of an impurity, and functional groups contained therein. Furthermore, the invention provides ease of operation and, hence, the method attains satisfactory reproducibility even when scaled up to industrial production. The purification method can be considered to be highly suitable for industrial production. The high-molecular-weight polyoxyalkylene derivative obtained by the purification method of the invention has a high purity with a reduced impurity content. Through production by the purification method of the invention, a high-purity product is easily obtained. Bio-related substances modified with the high-molecular-weight polyoxyalkylene derivative according to the invention have a low impurity content, have excellent safety and stability, and are useful.

MODES FOR CARRYING OUT THE INVENTION

Figure 1:
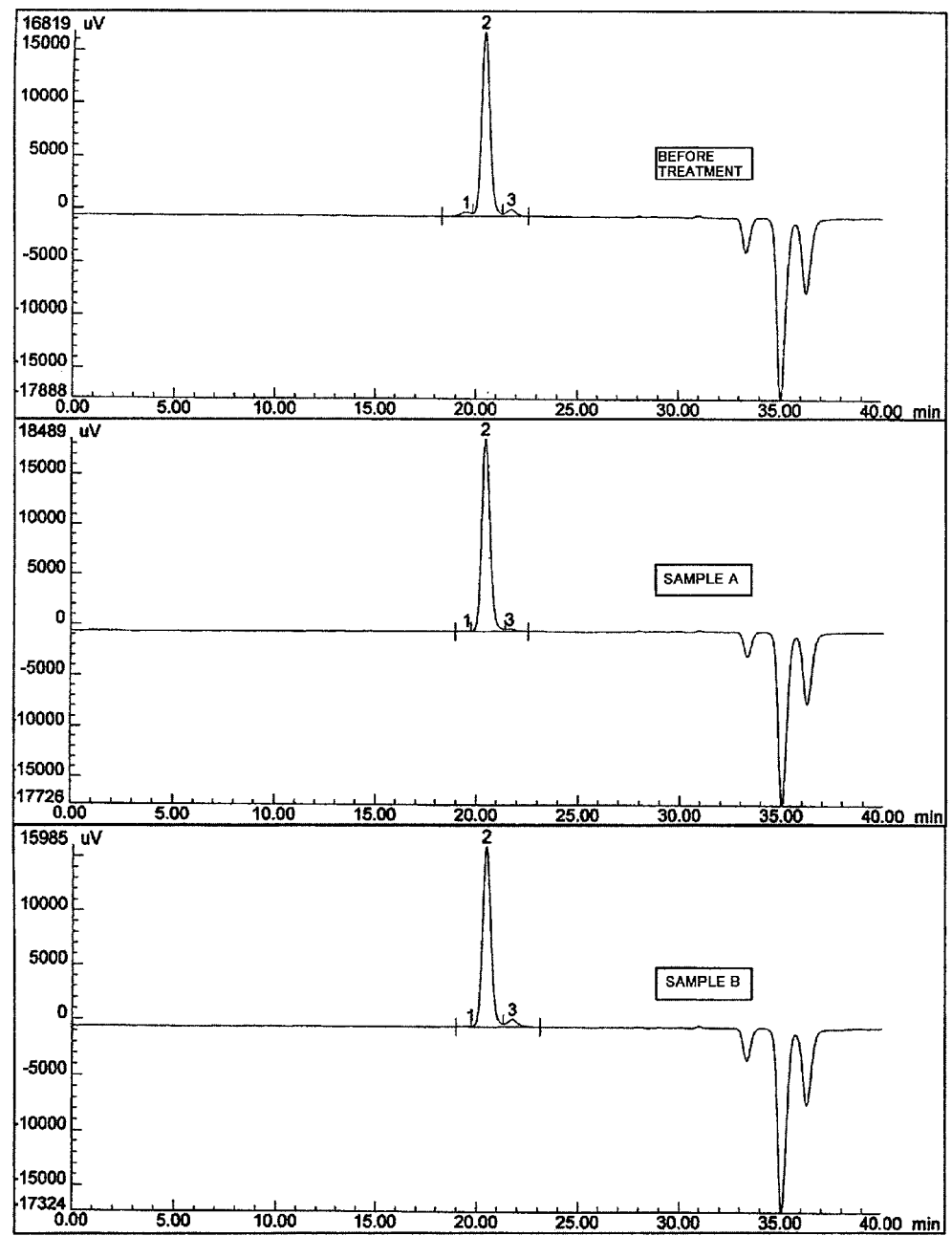
FIG. 1 is charts showing analytical results for a sample which has undergone no treatment, a sample A which has undergone the treatment of Example 6, and a sample B which has undergone the treatment of Comparative Example 2.

The invention specifically is a method of purifying a polyoxyalkylene derivative having a molecular weight of 8,800 to 100,000 represented by the following general formula [1] through an adsorption treatment step including the following operations.

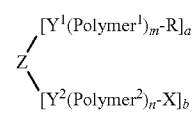

[1]

Z is a residue of a compound having 2 to 8 active hydrogen atoms. Examples of the compound include polyhydric alcohols such as ethylene glycol, propylene glycol, trimethylene glycol, isopropylene glycol, butylene glycol, tetramethylene glycol, trimethylolpropane, glycerol, diglycerol, triglycerol, tetraglycerol, pentaglycerol, hexaglycerol, pentaerythritol, dipentaerythritol, and xylitol, amino acids and peptides having an amino group, carboxyl group, or thiol group, such as lysine and glutamic acid, or compounds such as organic amines and organic carboxylic acids. The term residue herein means a residue formed by the removal of hydroxyl groups in the case of hydroxyl groups and carboxyl groups, and means a residue formed by the removal of hydrogen atoms in the case of amino groups, secondary amino groups, and thiol groups.

$Y^1$ and $Y^2$ are linking groups which connect Z with the polyoxyalkylene chains. Although $Y^1$ and $Y^2$ are not particularly limited so long as they are covalent bonds, preferred examples thereof include an ether bond, thioether bond, ester bond, urethane bond, amide bond, carbonate bond, secondary amino group, and alkylene groups containing any of these. Preferred examples of the alkylene group moiety include a methylene group, ethylene group, propylene group, isopropylene group, butylene group, isobutylene group, pentylene group, isopentylene group, and hexylene group, and these groups may be branched. More preferred are a methylene group, ethylene group, and propylene group. Specific linking groups vary depending on the active-hydrogen groups of Z. More preferred examples of $Y^1$ and $Y^2$ are shown below.

When a polyoxyalkylene derivative is combined with a hydroxyl group of Z, more preferred examples of $Y^1$ and $Y^2$ are —O—, —OCONH(CH$_2$)$_{2\,or\,3}$O—, —O(CH$_2$)$_{2\,or\,3}$NHCO(CH$_2$)$_{1-5}$O—, and —O(CH$_2$)$_{2\,or\,3}$NHCOO—.

When a polyoxyalkylene derivative is combined with an amino group of Z, more preferred examples of $Y^1$ and $Y^2$ are —CO(CH$_2$)$_{1-5}$O—, —COO—, and —CO—.

When a polyoxyalkylene derivative is combined with a carboxyl group of Z, more preferred examples of $Y^1$ and $Y^2$ are —O— and —NH(CH$_2$)$_{2\,or\,3}$O—.

When a polyoxyalkylene derivative is combined with a thiol group of Z, a more preferred example of $Y^1$ and $Y^2$ is —S—.

Polymer$^1$ and Polymer$^2$ are linear or branched polyoxyalkylene chains comprised of oxyalkylene group having 2 to 4 carbon atoms. Examples of the polyoxyalkylene chains include polyoxyethylene, polyoxy-1-ethylethylene, polyoxy-1,2-dimethylethylene, polyoxypropylene, polyoxytrimethylene, and block copolymers or random copolymers of these. For application to medicines, since it is necessary to dissolve drugs in the blood, the polyoxyalkylene derivative to be used as a modifying agent therefor is desired to be one having high water solubility. From this standpoint, preferred polyoxyalkylene chains are polyoxyethylene and polyoxypropylene. More preferred is polyoxyethylene. A branched polyoxyalkylene chain is a polyoxyalkylene chain including two or more branch chains connected through a linker. There may be a plurality of branching sites. An example thereof is a polyoxyalkylene chain including two or more branch chains extending from a polyhydric alcohol, e.g., glycerol, as branching sites as shown in the following formula (i).

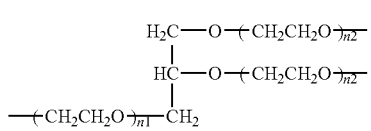

(In the formula, n1 is 1 to 2,300, preferably 20 to 1,000, more preferably 100 to 1,000; and n2 is 1 to 1,200, preferably 20 to 1,000, more preferably 100 to 1,000).

R is a hydrocarbon group having 1 to 7 carbon atoms or an acetal group having 3 to 9 carbon atoms. Examples of the hydrocarbon group and acetal group include methyl, ethyl, propyl, isopropyl, butyl, t-butyl, pentyl, isopentyl, cyclopentyl, hexyl, 2-hexyl, 3-hexyl, cyclohexyl, phenyl, benzyl, a diethyl acetal group, a dimethyl acetal group, a diisopropyl acetal group, and 1,3-dioxolane. Preferred hydrocarbon groups are methyl, t-butyl, and benzyl, and a preferred acetal group is a diethyl acetal group.

X is an amino group, a protected amino group, a protected carboxyl group, an aldehyde group, a protected aldehyde group, a hydroxyl group, a protected hydroxyl group, a thiol group, a protected thiol group, a sulfonyl group, a vinyl group, an allyl group, a cyano group, and an alkylene group containing any of these, or a hydrogen atom. Examples of the alkylene group include methylene, ethylene, propylene, isopropylene, butylene, isobutylene, pentylene, isopentylene, and hexylene. Preferred are methylene, ethylene, and propylene. More preferred is ethylene. With respect to X, when n, which will be described later, is n=1 and there is Polymer$^2$, then X is a functional group located at the end of the polyoxyalkylene chain. When n=0 and there is no Polymer$^2$, i.e., when X is directly linked to Y, which is a linking group, then X is either the functional group combined with Z or an alkylene group combined with Z and containing the functional group. When X is a hydrogen atom, then this X represents an active-hydrogen group not participating in the bonding of Z to a polyoxyalkylene chain.

Symbols m and n are 1 or 0 and satisfy $1 \leq m+n$;
a and b are integers satisfying $0 \leq a \leq 8$, $0 \leq b \leq 8$, and $2 \leq a+b \leq 8$; and
when a and b are integers of 2 or larger, then $Y^1$ and $Y^2$, Polymer$^1$ and Polymer$^2$, R, X, m, and n may be the same or different in the molecule.

Each step is explained below in detail.

Step (A): a step in which an aprotic organic solvent is used in an amount at least 5 times by weight the amount of the polyoxyalkylene derivative represented by general formula [1] to dissolve the polyoxyalkylene derivative The solvent desirably is a solvent which is an aprotic solvent and has low polarity and in which the polyoxyalkylene derivative is highly soluble. Examples of the aprotic organic solvent include toluene, xylene, benzene, ethyl acetate, butyl acetate, chloroform, dichloromethane, acetone, acetonitrile, and tetrahydrofuran. Preferred aprotic organic solvents are toluene and ethyl acetate. More preferred is toluene. Protonic solvents are undesirable because the solvents impair interaction between the polyoxyalkylene derivative and the adsorbent.

It is desirable that the amount of the solvent be at least 5 times by weight the amount of the polyoxyalkylene derivative represented by general formula [1]. In case where the amount thereof is smaller than 5 times by weight, the solution has increased viscosity, resulting in impaired purification efficiency and also in impaired yield. It is therefore advantageous from the standpoint of production to regulate the solvent amount to at least 5 times by weight. Even when the amount of the solvent is increased to 30 times by weight or more, the purification efficiency remains satisfactory. However, such large solvent amounts necessitate treatment of an increased volume in the later filtration operation, resulting in an increase in man-hour and a decrease in yield. Too large solvent amounts are disadvantageous from the standpoint of cost. For these reasons, the solvent amount is preferably 5 to 30 times by weight, more preferably 10 to 20 times.

The solvent is used to dissolve the polyoxyalkylene derivative therein. With respect to the sequence of loading into a treating vessel, either the polyoxyalkylene derivative or the aprotic organic solvent may be introduced first. Some polyoxyalkylene derivatives necessitate heating, depending on the molecular weight thereof. Methods therefor are not particularly limited. In general, the polyoxyalkylene derivatives can be dissolved by heating to 30° C. or higher.

Step (B): a step in which an inorganic adsorbent constituted of an oxide containing at least one of aluminum and silicon is added in an amount of 0.5 to 5 times by weight the amount of the polyoxyalkylene derivative to thereby yield a slurry The inorganic adsorbent constituted of an oxide containing at least one of aluminum and silicon is an oxide containing either aluminum atoms or silicon atoms or both therein. Examples thereof include aluminum oxide, silicon dioxide, composite oxides composed of aluminum oxide and silicon dioxide, composite oxides composed of aluminum oxide and another metal, and composite oxides composed of silicon dioxide and another metal. Examples of "another metal" include oxides of sodium, magnesium, and calcium.

Such adsorbents may be used alone or in combination.

Since the invention is a method of separation according to the number of hydroxyl groups in the molecule, adsorbents which interact with hydroxyl groups are advantageous. Preferred inorganic adsorbents are aluminum oxide ($Al_2O_3$), silicon dioxide ($SiO_2$), and composite oxides including aluminum and silicon. More preferred are ($Al_2O_3$), ($SiO_2$), ($Al_2O_3.H_2O$), and ($Al_2O_3.9SiO_2.H_2O$). Especially preferred are ($Al_2O_3$), ($SiO_2$), and ($Al_2O_3.H_2O$). Most preferred is ($Al_2O_3.H_2O$).

Specific examples thereof include activated alumina ($Al_2O_3$), silica gel ($SiO_2$), and Kyoward 200B ($Al_2O_3.H_2O$), Kyoward 700 ($Al_2O_3.9SiO_2.H_2O$), Kyoward 2000 ($Mg_{0.7}Al_{0.3}O_{1.15}$), and Kyoward 300 ($2.5MgO.Al_2O_3.XH_2O$) (x is $9 \leq x \leq 11$) among the Kyoward Series, manufactured by Kyowa Chemical Industry Co., Ltd.

The amount of the adsorbent is desirably in the range of 0.5 to 5 times by weight the amount of the polyoxyalkylene derivative represented by general formula [1]. In case where the amount thereof is smaller than 0.5, a sufficient purification effect is not obtained. In case where the amount thereof is larger than 5 times by weight, the amount to be treated is large, resulting in a decrease in yield and an increase in man-hour. For these reasons, the amount of the adsorbent in cases A, B, and C is preferably 1 to 3 times by weight, more preferably 2 times by weight, and the amount of the adsorbent in cases D and E is preferably 2 to 5 times by weight, more preferably 3 times by weight.

step (c): a step in which the slurry is stirred at 25° C. or higher

This step (C) is a step in which the adsorbent is added to the solution of step (B) to prepare a slurry of the adsorbent and this slurry is subjected to an adsorption treatment. The treatment temperature is preferably 25 to 80° C. In case where the temperature is lower than 25° C., the solution has high viscosity, resulting in impaired purification efficiency. Furthermore, crystal precipitation undesirably occurs depending on the structure or molecular weight of the polyoxyalkylene derivative. Consequently, the treatment temperature is desirably 25° C. or higher. A preferred temperature range is 40 to 100° C., and a more preferred range is 40 to 60° C. At a temperature within that range, the slurry is stirred for 30 minutes or more in an inert gas atmosphere or with inert-gas bubbling to perform an adsorption treatment. Through this operation, a polyoxyalkylene derivative having a large number of hydroxyl groups in the molecule is adsorbed onto the adsorbent.

Step (D): a step in which the polyoxyalkylene derivative is recovered from the slurry This step (D) is a step in which the adsorbent and the solvent are removed from the solution which has undergone the adsorption treatment in step (C), and the desired polyoxyalkylene derivative is thereby isolated. Methods for removing the adsorbent are not particularly limited. In general, however, the adsorbent is removed by vacuum filtration or pressure filtration. In this operation, it is desirable that the filter should be heated beforehand to the same temperature as the treatment temperature used in step (C), for the purpose of preventing crystal precipitation from occurring upon a temperature drop during filtration. After the filtration, the desired polyoxyalkylene derivative is contained in the filtrate when the desired derivative has a smaller number of hydroxyl groups than the impurity polyoxyalkylene, and is contained in the filter cake when the desired derivative has a larger number of hydroxyl groups. Isolation of the desired polyoxyalkylene from the filtrate and isolation thereof from the filter cake differ in method. In the case of isolation from the filtrate, there is no particular limitations on removal of the solvent as compared with the impurity. However, a preferred method is removal by vacuum distillation or by reprecipitation. In the case of isolation from the filter cake, use may be made of a method including adding an organic solvent to the filter cake, removing the adsorbent using the method again, and removing the solvent by the method.

Each case is explained below.

In step (D), when the desired polyoxyalkylene derivative has a smaller number of hydroxyl groups than the impurity polyoxyalkylene derivative, the desired compound is present in the filtrate and the impurity remains on the adsorbent, because the desired compound shows a weaker interaction with the adsorbent than the impurity. Because of this, in this step (D), the desired compound is isolated by vacuum distillation or reprecipitation from the filtrate resulting from the filtration.

Representative polyoxyalkylene derivatives suitable for this method are shown below.

(The case where a water-derived impurity diol is removed from a linear polyoxyalkylene derivative having one hydroxyl group in case A)

In general formula [1], a and b respectively are a=1 and b=1; and m and n respectively are m=1 and n=0.

Z is the residue formed by removing the hydroxyl groups from a compound having two hydroxyl groups. Examples of the compound include ethylene glycol.

$Y^1$ and $Y^2$, which are linking groups that connect Z with the polyoxyalkylene chains, are ether bonds.

Polymer$^1$ is a linear polyoxyalkylene chain comprised of oxyalkylene group having 2 to 4 carbon atoms. Preferred polyoxyalkylene chains are polyoxyethylene and polyoxypropylene. More preferred is polyoxyethylene.

R is a hydrocarbon group having 1 to 7 carbon atoms or an acetal group having 3 to 9 carbon atoms. R preferably is methyl, t-butyl, benzyl, or a diethyl acetal group, more preferably is methyl or a diethyl acetal group, and even more preferably is methyl.

X is a hydrogen atom.

(The Case where an Impurity Polyoxyalkylene Derivative which is a Linear or Branched Polyoxyalkylene Derivative Having a Hydroxyl Group is Removed from a Branched Polyoxyalkylene Derivative in Case B)

In general formula [1], a and b respectively are integers satisfying $0 \leq a \leq 8$, $0 \leq b \leq 8$, and $2 \leq a+b \leq 8$; and m and n respectively are m=1 or 0 and n=1.

Z is a residue of a polyhydric alcohol or of an amino acid or peptide. Preferred polyhydric alcohols are glycerol and pentaerythritol. More preferred is glycerol. Preferred amino acids are lysine and glutamic acid.

$Y^1$ and $Y^2$ are linking groups which connect Z with the polyoxyalkylene chains. Although $Y^1$ and $Y^2$ are not particularly limited so long as they are covalent bonds, preferred examples thereof include an ether bond, thioether bond, ester bond, urethane bond, amide bond, carbonate bond, secondary amino group, and alkylene groups containing any of these. Preferred examples of the alkylene groups include a methylene group, ethylene group, propylene group, isopropylene group, butylene group, isobutylene group, pentylene group, isopentylene group, and hexylene group. More preferred are a methylene group, ethylene group, and propylene group. Specific linking groups vary depending on the active-hydrogen groups of Z. Preferred examples of $Y^1$ and $Y^2$ are shown below.

When a polyoxyalkylene derivative is combined with a hydroxyl group of Z, preferred examples of $Y^1$ and $Y^2$ are —O—, —OCONH(CH$_2$)$_{2or3}$O—, —O(CH$_2$)$_{2or3}$NHCO(CH$_2$)$_{1-5}$O—, and —O(CH$_2$)$_{2or3}$NHCOO—.

When a polyoxyalkylene derivative is combined with an amino group of Z, preferred examples of $Y^1$ and $Y^2$ are —CO(CH$_2$)$_{1-5}$O—, —COO—, and —CO—.

When a polyoxyalkylene derivative is combined with a carboxyl group of Z, preferred examples of $Y^1$ and $Y^2$ are —O— and —NH(CH$_2$)$_{2or3}$O—.

When a polyoxyalkylene derivative is combined with a thiol group of Z, a preferred example of $Y^1$ and $Y^2$ is —S—.

$Polymer^1$ and $Polymer^2$ are linear or branched polyoxyalkylene chains comprised of oxyalkylene group having 2 to 4 carbon atoms. Preferred polyoxyalkylene chains are polyoxyethylene and polyoxypropylene. More preferred is polyoxyethylene.

R is a hydrocarbon group having 1 to 7 carbon atoms or an acetal group having 3 to 9 carbon atoms. R preferably is methyl, t-butyl, benzyl, or a diethyl acetal group, and more preferably is methyl.

X is a protected amino group, protected carboxyl group, protected aldehyde group, protected hydroxyl group, protected thiol group, cyano group, and alkylene group containing any of these. The alkylene group preferably is methylene, ethylene, or propylene, and more preferably is ethylene.

Preferred examples of X are shown below as formulae (II), (iii), (iv), and (v).

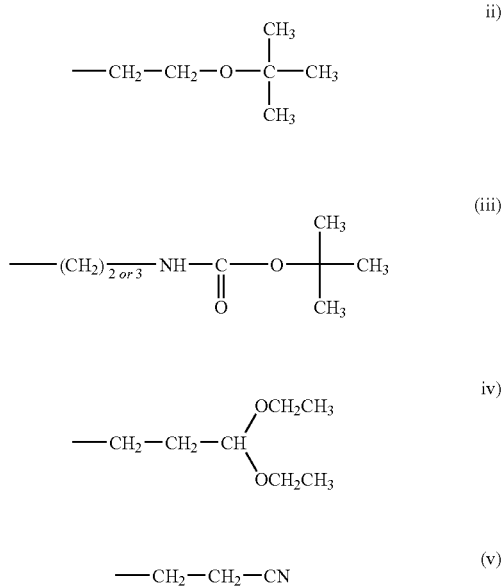

Furthermore, when a and b are integers of 2 or larger, the $Y^1$ and $Y^2$, $Polymer^1$ and $Polymer^2$, R, X, m, and n described above may be the same or different in the molecule.

Examples of specific forms in case B are shown in Table 1.

TABLE 1

| Desired compound | Impurity to be removed |
|---|---|
| ① $H_2C-O-(CH_2CH_2O)_n-CH_3$<br>$HC-O-(CH_2CH_2O)_n-CH_3$<br>$H_2C-O-C(=O)-N(H)-(CH_2)_{2\,or\,3}-O-(CH_2CH_2O)_m-X$ | $H_2C-O-(CH_2CH_2O)_n-CH_3$<br>$HC-O-(CH_2CH_2O)_n-CH_3$<br>$H_2C-OH$<br><br>$HO-(CH_2CH_2O)_m-X$ |

(The Case where an Impurity Polyoxyalkylene Derivative Having Unreacted Hydroxyl Groups Remaining after Conversion of Terminal Hydroxyl Groups into Hydrocarbon Groups, e.g., Methoxy, Acetal Groups, or Cyano Groups as a Precursor for Amino Groups or into Amino-Protective Groups, etc. is Removed from a Polyoxyalkylene Derivative in Case C)

In general formula [1], a and b respectively are integers satisfying $0 \leq a \leq 8$, $0 \leq b \leq 8$, and $2 \leq a+b \leq 8$; and m and n each are 1 or 0 and $1 \leq m+n$.

Z is the residue formed by removing the hydroxyl groups from a polyhydric alcohol. Preferred polyhydric alcohols are ethylene glycol, propylene glycol, trimethylolpropane, trimethylene glycol, glycerol, diglycerol, triglycerol, tetraglycerol, pentaglycerol, hexaglycerol, pentaerythritol, dipentaerythritol, and xylitol.

$Y^1$ and $Y^2$, which are linking groups that connect Z with the polyoxyalkylene chains, are ether bonds.

$Polymer^1$ and $Polymer^2$ are linear or branched polyoxyalkylene chains comprised of oxyalkylene group having 2 to 4 carbon atoms. Preferred polyoxyalkylene chains are polyoxyethylene and polyoxypropylene. More preferred is polyoxyethylene.

R is a hydrocarbon group having 1 to 7 carbon atoms or an acetal group having 3 to 9 carbon atoms. R preferably is methyl, t-butyl, benzyl, or a diethyl acetal group, and more preferably is methyl.

X is a protected amino group, protected carboxyl group, protected aldehyde group, protected hydroxyl group, protected thiol group, cyano group, and alkylene group containing any of these. The alkylene group preferably is methylene, ethylene, or propylene, and more preferably is ethylene.

Preferred examples of X are shown below as formulae (iii), (iv), and (v).

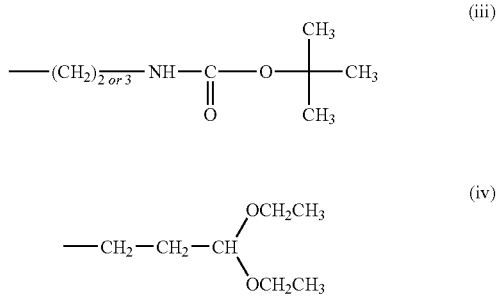

-continued $—CH_2—CH_2—CN$ (v)

Furthermore, when a and b are integers of 2 or larger, the $Y^1$ and $Y^2$, Polymer$^1$ and Polymer$^2$, R, X, m, and n described above may be the same or different in the molecule.

Examples of specific forms in case C are shown in Tables 2 and 3.

cake resulting from the filtration to thereby attain an improvement in yield. Removal of the solvent from the filtrate recovered is not particularly limited. However, it is preferred to remove the solvent by vacuum distillation or by reprecipitation.

TABLE 2

In the case of linear polyoxyalkylene derivative

| Desired compound | Impurity to be removed |
|---|---|
| ② $CH_3\text{—}(OH_2CH_2C)_n\text{—}O\text{—}CH_2CH_2\text{—}O\text{—}X$ | $CH_3\text{—}(OH_2CH_2C)_n\text{—}O\text{—}CH_2CH_2\text{—}OH$ |

TABLE 3

In the case of branched polyoxyalkylene derivative

| Desired compound | Impurity to be removed |
|---|---|
| ③ $H_2C\text{—}O\text{—}(CH_2CH_2O)_n\text{—}X$<br>$HC\text{—}O\text{—}(CH_2CH_2O)_n\text{—}X$<br>$H_2C\text{—}O\text{—}(CH_2CH_2O)_n\text{—}X$ | $H_2C\text{—}O\text{—}(CH_2CH_2O)_n\text{—}OH$<br>$HC\text{—}O\text{—}(CH_2CH_2O)_n\text{—}OH$<br>$H_2C\text{—}O\text{—}(CH_2CH_2O)_n\text{—}OH$ |
| | $H_2C\text{—}O\text{—}(CH_2CH_2O)_n\text{—}X$<br>$HC\text{—}O\text{—}(CH_2CH_2O)_n\text{—}OH$<br>$H_2C\text{—}O\text{—}(CH_2CH_2O)_n\text{—}OH$ |
| | $H_2C\text{—}O\text{—}(CH_2CH_2O)_n\text{—}X$<br>$HC\text{—}O\text{—}(CH_2CH_2O)_n\text{—}X$<br>$H_2C\text{—}O\text{—}(CH_2CH_2O)_n\text{—}OH$ |

In step (D), when the desired polyoxyalkylene derivative has a larger number of hydroxyl groups than an impurity polyoxyalkylene derivative, the desired derivative shows a stronger interaction with the adsorbent than the impurity because of the larger number of hydroxyl groups thereof. Consequently, in step (D), the impurity is present in the filtrate and the desired compound remains on the adsorbent. It is therefore necessary to further perform the following step (E) after this step (D).

Step (E): a Step in which the Slurry Solution is Filtered and the Compound of Formula (I) is Recovered from the Filter Cake This step (E) is a step in which the filter cake is recovered after step (D) and an organic solvent is added thereto to conduct filtration again. It is advantageous to use a polar solvent as the organic solvent. Preferred is a protonic solvent such as methanol or ethanol. More preferred is ethanol. Although the amount of the solvent is not particularly limited, the amount thereof is desirably at least 5 times by weight the amount of the polyoxyalkylene derivative. The treatment temperature is preferably 40° C. or higher. Removal of the adsorbent by filtration is not particular limited. In general, however, the adsorbent is removed by vacuum filtration or pressure filtration. In this operation, it is desirable that the filter should be heated beforehand to the same temperature as the treatment temperature for the purpose of preventing crystal precipitation from occurring upon a temperature drop during filtration. It is also desirable that methanol or ethanol which has been heated beforehand to the same temperature as the treatment temperature should be used to wash the filter Polyoxyalkylene derivatives suitable for this method are shown below.

(The case where a water-derived diol is removed from a branched polyoxyalkylene derivative having three or more hydroxyl groups in case D)

In general formula [1], a and b respectively are integers satisfying a=0 or 1, $2 \leq b \leq 8$, and $3 \leq a+b \leq 8$; and m and n respectively are m=0 and n=1.

Z is the residue formed by removing the hydroxyl groups from a polyhydric alcohol. Preferred polyhydric alcohols are trimethylolpropane, glycerol, diglycerol, triglycerol, tetraglycerol, pentaglycerol, hexaglycerol, pentaerythritol, dipentaerythritol, and xylitol. More preferred are glycerol, diglycerol, and pentaerythritol.

$Y^1$ and $Y^2$, which are linking groups that connect Z with the polyoxyalkylene chains, are ether bonds.

Polymer$^1$ and Polymer$^2$ are linear or branched polyoxyalkylene chains comprised of oxyalkylene group having 2 to 4 carbon atoms. Preferred polyoxyalkylene chains are polyoxyethylene and polyoxypropylene. More preferred is polyoxyethylene.

R is a hydrocarbon group having 1 to 7 carbon atoms or an acetal group having 3 to 9 carbon atoms. R preferably is methyl, t-butyl, benzyl, or a diethyl acetal group, and more preferably is benzyl.

X is an alkylene group containing a hydroxyl group. Preferred alkylene groups are ethylene and propylene. More preferred is ethylene.

(The Case where a Linear Polyoxyalkylene Derivative in which One End Remains Unreacted as a Hydroxyl Group is Removed from a Branched Polyoxyalkylene Derivative in Case E)

In general formula [1], a and b respectively are integers satisfying $0 \leq a \leq 8$, $0 \leq b \leq 8$, and $2 \leq a+b \leq 8$; and m and n each are 1 or 0 and $1 \leq m+n$.

Z is a compound such as a polyhydric alcohol or an amino acid or peptide. Preferred polyhydric alcohols and amino acids are ethylene glycol, glycerol, lysine, and glutamic acid.

$Y^1$ and $Y^2$ are linking groups which connect Z with the polyoxyalkylene chains. Preferred examples thereof include an ether bond, thioether bond, ester bond, urethane bond, amide bond, carbonate bond, secondary amino group, and alkylene groups containing any of these. Preferred examples of the alkylene groups include a methylene group, ethylene group, propylene group, isopropylene group, butylene group, isobutylene group, pentylene group, isopentylene group, and hexylene group. More preferred are a methylene group, ethylene group, and propylene group. Specific linking groups vary depending on the active-hydrogen groups of Z. Preferred examples of Y1 and Y2 are shown below.

When a polyoxyalkylene derivative is combined with a hydroxyl group of Z, preferred examples of $Y^1$ and $Y^2$ are —O—, —OCONH(CH$_2$)$_{2or3}$O—, —O(CH$_2$)$_{2or3}$NHCO(CH$_2$)$_{1-5}$O—, and —O(CH$_2$)$_{2or3}$NHCOO—.

When a polyoxyalkylene derivative is combined with an amino group of Z, preferred examples of $Y^1$ and $Y^2$ are —CO(CH$_2$)$_{1-5}$O—, —COO—, and —CO—.

When a polyoxyalkylene derivative is combined with a carboxyl group of Z, preferred examples of $Y^1$ and $Y^2$ are —O— and —NH(CH$_2$)$_{2or3}$O—.

When a polyoxyalkylene derivative is combined with a thiol group of Z, a preferred example of $Y^1$ and $Y^2$ is —S—.

Polymer$^1$ and Polymer$^2$ are linear or branched polyoxyalkylene chains comprised of oxyalkylene group having 2 to 4 carbon atoms. Preferred polyoxyalkylene chains are polyoxyethylene and polyoxypropylene. More preferred is polyoxyethylene.

R is a hydrocarbon group having 1 to 7 carbon atoms or an acetal group having 3 to 9 carbon atoms. R preferably is methyl, t-butyl, benzyl, or a diethyl acetal group, and more preferably is methyl.

X is an amino group, protected amino group, protected carboxyl group, aldehyde group, protected aldehyde group, hydroxyl group, protected hydroxyl group, thiol group, protected thiol group, cyano group, and alkylene group containing any of these or is a hydrogen atom. Preferred examples of the alkylene group include methylene, ethylene, propylene, isopropylene, butylene, isobutylene, pentylene, isopentylene, and hexylene. Preferably, X is an alkylene group containing a hydroxyl group or is a hydrogen atom.

Furthermore, when a and b are integers of 2 or larger, the $Y^1$ and $Y^2$, Polymer$^1$ and Polymer$^2$, R, X, m, and n described above may be the same or different in the molecule.

Examples of specific forms in case E are shown in Table 4.

The examination method is described below.

As a GPC system was used SHODEX GPC SYSTEM-11. Developing solvent, tetrahydrofuran; flow rate, 1 mL/min; columns, SHODEX KF-801, KF-803, KF-804 (8 mm I.D×30 cm); column temperature, 40° C.; detector, RI×8; sample amount, 1 mg/g; injection amount, 100 μL.

The GPC data are processed in the following manner. The peaks for a high-molecular-weight impurity and a low-molecular-weight impurity on the elution curve are separated by drawing a line perpendicular to the base line from each point of inflection with respect to the main peak to separate the peaks, and the areal percentage of each peak is calculated from the values of the areas of the peaks.

Example 1-1

Into a 5-L four-necked flask were introduced 100 g of methoxypolyethylene glycol (hereinafter referred to as mPEG) (molecular weight, 30,000; diol content, 2.81%) and 1,500 g (1,700 mL) of toluene. A Three-One Motor, a condenser, and a nitrogen bubbling tube were attached thereto, and the mPEG was dissolved at 55° C. using a mantle heater. Two hundred grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. To the recovered filtrate was added 1,000 g of hexane to cause crystallization. The crystals precipitated were taken out by filtration and vacuum-dried, and a sample was recovered (50 g).

As a result of GPC analysis, the sample was found to have a diol content of 0.3%.

In Examples 1-2 to 1-24, experiments were conducted according to the operation of Example 1, except that the following conditions were changed: the molecular weight of

TABLE 4

| Desired compound | Impurity to be removed |
|---|---|
| ④ H$_2$C—O—(CH$_2$CH$_2$O)$_n$—CH$_3$<br>HC—O—(CH$_2$CH$_2$O)$_n$—CH$_3$<br>H$_2$C—O—(CH$_2$)$_{2or3}$—NH—C(=O)—O—(CH$_2$CH$_2$O)$_m$—OH | H$_2$C—O—(CH$_2$CH$_2$O)$_n$—CH$_3$<br>HC—O—(CH$_2$CH$_2$O)$_n$—CH$_3$<br>H$_2$C—O—(CH$_2$)$_{2or3}$—NH$_2$ |

The polyoxyalkylene derivatives in cases A to E have a molecular weight of 8,800 to 100,000. However, the desired molecular weights of polyoxyalkylenes tend to increase, because polyoxyalkylene derivatives for recent clinical applications are required to have the improved long circulation property in the blood and be prevented from reducing the activity of physiologically active substances. Consequently, the molecular weights of the polyoxyalkylene derivatives are preferably 10,000 to 100,000, more preferably 20,000 to 100,000, even more preferably 30,000 to 100,000.

The operations of steps (A) to (D) or steps (A) to (E) may be repeated. Especially when an impurity is contained in a large amount, repeating the operations can improve purity.

EXAMPLES

The invention will be explained below in greater detail by reference to Examples.

With respect to the purity of polyoxyalkylene derivatives obtained, the polymers were examined for molecular weight distribution through gel permeation chromatography (GPC).

methoxypolyethylene glycol, kind of solvent, solvent amount, kind of adsorbent, and adsorbent amount. The results thereof are shown in the following Tables 5 to 11.

Examples 1-1 to 1-7

Examples in which the Kind of Solvent was Changed

Into a 5-L four-necked flask were introduced 100 g of mPEG (molecular weight, 30,000; diol content, 2.81%) and 1,700 mL of any of the solvents shown in the following table. A Three-One Motor, a condenser, and a nitrogen bubbling tube were attached thereto, and the mPEG was dissolved at around 40° C. using a mantle heater. Two hundred grams of Kyoward 200B (Kyowa Chemical Industry) was added thereto, and the mixture was stirred for 1 hour at a temperature which was 40° C. to 55° C. and not higher than the boiling point of the solvent. A Nutsche funnel with 5 A filter paper was prepared, and the mixture was subjected to suction filtration. The filtrate was recovered. To the recovered filtrate was added 1,000 g of hexane to cause crystallization. The crystals precipitated were taken out by filtration and vacuum-dried to recover a sample. With respect to chloroform, acetone, tetrahydrofuran, and dichloromethane, a sample was recovered by concentrating the filtrate with an evaporator, subsequently redissolving the concentrate in 1,000 g of ethyl acetate, thereafter adding 1,000 g of hexane thereto to cause crystallization, taking out the precipitated crystals by filtration, and vacuum-drying the crystals.

TABLE 5

| | Example | | | | | | |
|---|---|---|---|---|---|---|---|
| | 1-1 | 1-2 | 1-3 | 1-4 | 1-5 | 1-6 | 1-7 |
| Kind of solvent | toluene | ethyl acetate | chloroform | acetone | acentonitrile | tetrahydrofuran | dichloromethane |
| Amount of solvent (g) | 1500 | 1550 | 2590 | 1360 | 1360 | 1530 | 2290 |
| Content of diol (%) | 0.3 | 0.73 | 1.07 | 1.56 | 1.54 | 1.44 | 1.48 |
| Yield (%) | 50 | 50 | 60 | 24 | 62 | 57 | 40 |

The results given above show that among the nonpolar aprotic solvents, those having lower polarity, such as toluene and ethyl acetate, are more effective.

Comparative Examples 1-1 and 1-2

Examples in which the Kind of Solvent was Changed

An operation was conducted by the method of Examples 1-1 to 1-7 using ethanol, which is a protonic solvent, and DMF, which is an aprotic solvent but has high polarity, as the solvent. The results thereof are shown in the following Table 6.

TABLE 6

| | Comparative Example | |
|---|---|---|
| | 1-1 | 1-2 |
| Kind of solvent | ethanol | DMF |
| Content of diol (%) | 2.54 | 2.69 |
| Yield (%) | 21 | 29 |

The results given above show that the protonic solvent and the highly polar solvent had no purification effect.

Examples 1-8 to 1-13

Examples in which Solvent Amount was Changed

Into a 5-L four-necked flask were introduced 100 g of mPEG (molecular weight, 30,000; diol content, 2.81%) and toluene (amount is shown in the table). A Three-One Motor, a condenser, and a nitrogen bubbling tube were attached thereto, and the mPEG was dissolved at 55° C. using a mantle heater. Two hundred grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. To the recovered filtrate was added 1,000 g of hexane to cause crystallization. The crystals precipitated were taken out by filtration and vacuum-dried, and a sample was recovered.

TABLE 7

| | Example | | | | | | |
|---|---|---|---|---|---|---|---|
| | 1-8 | 1-9 | 1-1 | 1-10 | 1-11 | 1-12 | 1-13 |
| Toluene, times by weight (based on mPEG) | 7.5 | 10 | 15 | 20 | 25 | 30 | 50 |

TABLE 7-continued

| | Example | | | | | | |
|---|---|---|---|---|---|---|---|
| | 1-8 | 1-9 | 1-1 | 1-10 | 1-11 | 1-12 | 1-13 |
| Content of diol (%) | 0.85 | 0.6 | 0.3 | 0.23 | 0.31 | 0.07 | 0.27 |
| Yield (%) | 39 | 44 | 50 | 47 | 48 | 50 | 54 |

The results given above show that small solvent amounts result in a poor purification efficiency and a poor yield, and that although the purification efficiency and yield are improved by increasing the solvent amount, the solvent amounts exceeding 20 times result in substantially no change in purification effect.

Examples 1-14 to 1-18

Examples in which the Kind of Adsorbent was Changed

Into a 5-L four-necked flask were introduced 100 g of mPEG (molecular weight, 30,000; diol content, 2.81%) and 1,500 g of toluene. A Three-One Motor, a condenser, and a nitrogen bubbling tube were attached thereto, and the mPEG was dissolved at 55° C. using a mantle heater. Two hundred grams of any of the adsorbents shown in the following table was added thereto, and the mixture was stirred at 55° C. for 1 hour. A Nutsche funnel with 5 A filter paper was prepared, and the mixture was subjected to suction filtration. The filtrate was recovered. To the recovered filtrate was added 1,000 g of hexane to cause crystallization. The crystals precipitated were taken out by filtration and vacuum-dried, and a sample was recovered.

TABLE 8

| | Example | | | | | |
|---|---|---|---|---|---|---|
| | 1-14 | 1-1 | 1-15 | 1-16 | 1-17 | 1-18 |
| Kind of adsorbent | Activated alumina | KW200B | Silica gel | KW700 | KW300 | KW2000 |
| Content of diol (%) | 0.6 | 0.3 | 0.4 | 0.77 | 1.1 | 1.3 |
| Yield (%) | 70 | 50 | 25 | 53 | 60 | 60 |

* KW: Kyoward

The results given above show that the inorganic adsorbents constituted of an oxide containing at least one of aluminum and silicon were effective.

Comparative Examples 1-3 to 1-6

Examples in which the Kind of Adsorbent was Changed

An operation was conducted by the method of Examples 1-8 to 1-13 using as the adsorbent a metal salt or metal oxide not containing an oxide of aluminum or silicon. The results thereof are shown in the following Table 9.

TABLE 9

|  | Comparative Example | | | |
|---|---|---|---|---|
|  | 1-3 | 1-4 | 1-5 | 1-6 |
| Kind of solvent | MgSO4 | CaO | MgO | Al(OH)3 |
| Content of diol (%) | 2.51 | 2.52 | 2.26 | 2.67 |
| Yield (%) | 84 | 71 | 85 | 73 |

The results given above show that the metal oxides or salts of other kinds, which did not contain an oxide of aluminum or silicon, had no purification effect.

Examples 1-19 to 1-22

Examples in which Adsorbent Amount was Changed

Into a 5-L four-necked flask were introduced 100 g of mPEG (molecular weight, 30,000; diol content, 2.81%) and 1,500 g of toluene. A Three-One Motor, a condenser, and a nitrogen bubbling tube were attached thereto, and the mPEG was dissolved at 55° C. using a mantle heater. Kyoward 200B (Kyowa Chemical Industry) (amount is shown in the table) was added thereto, and the mixture was stirred at 55° C. for 1 hour. A Nutsche funnel with 5 A filter paper was prepared, and the mixture was subjected to suction filtration. The filtrate was recovered. To the recovered filtrate was added 1,000 g of hexane to cause crystallization. The crystals precipitated were taken out by filtration and vacuum-dried, and a sample was recovered.

TABLE 10

|  | Example | | | | |
|---|---|---|---|---|---|
|  | 1-19 | 1-20 | 1-1 | 1-21 | 1-22 |
| Times by weight (based on mPEG) | 0.5 | 1 | 2 | 4 | 5 |
| Content of diol (%) | 1.43 | 1.13 | 0.3 | 0.3 | 0.2 |
| Yield (%) | 80 | 68 | 50 | 45 | 30 |

The results given above show the following. A sufficient purification effect is observed even with an adsorbent amount of 0.5 times; and the larger the adsorbent amount, the higher the purification efficiency. However, yield became worse as the adsorbent amount increased.

Examples 1-23 and 1-24

Examples in which Molecular Weight of Methoxypolyethylene Glycol was Changed

Into a 5-L four-necked flask were introduced 100 g of mPEG (shown in the table) and 1,500 g of toluene. A Three-One Motor, a condenser, and a nitrogen bubbling tube were attached thereto, and the mPEG was dissolved at 55° C. using a mantle heater. Two hundred grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. To the recovered filtrate was added 1,000 g of hexane to cause crystallization. The crystals precipitated were taken out by filtration and vacuum-dried, and a sample was recovered.

TABLE 11

|  | Example | | |
|---|---|---|---|
|  | 1-23 | 1-1 | 1-24 |
| mPEG | 20,000 | 30,000 | 40,000 |
| Diol content before treatment (%) | 0.7 | 2.81 | 3.5 |
| After treatment | N.D | 0.3 | 0.5 |
| Yield (%) | 56 | 50 | 50 |

The results given above show that even when the molecular weight of methoxypolyethylene glycol changed, a sufficient purification effect was obtained.

Example 2

Into a 200-L glass reaction tank were introduced 5 kg of mPEG (molecular weight, 30,000; high-molecular-weight impurity content, 2.81%) and 10 kg of KW-200B, followed by 75 kg of toluene. The contents were heated to 55° C. and then stirred for 1 hour. This mixture was subjected to pressure filtration through a filter including filter paper corresponding to 5 A. This operation was repeated five times. The filtrate obtained was heated to 60° C. to distill off about 100 kg of the toluene at a reduced pressure. Thereafter, 75 kg of hexane was added to cause crystallization. The crystals precipitated were taken out by filtration and vacuum-dried to recover 12 kg of a sample.

As a result of GPC analysis, the sample was found to have a high-molecular-weight impurity content of 0.3%.

Example 3-1

Into a 3-L four-necked flask were introduced 100 g of α-(3,3-diethoxypropyl)-,ω-hydroxy-polyoxyethylene, which is shown by the following formula (a), (molecular weight, 20,000; diol, 2.88%) and 1,600 g of toluene. A Three-One Motor, a condenser, a water measuring tube, and a nitrogen bubbling tube were attached thereto. The contents were heated to 110° C. using a mantle heater, and the water contained was allowed to form an azeotrope with toluene. Refluxing dehydration was thus performed. After 100 g of the toluene was distilled off, the contents were cooled to 50° C. Two hundred grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. Hexane was added to the recovered filtrate to cause crystallization. The crystals precipitated were taken out by filtration and vacuum-dried, and a sample was recovered (50 g).

As a result of GPC analysis, the sample was found to have a diol content of 0.15%.

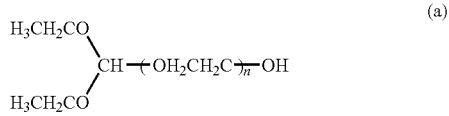

(a)

Example 3-2

Into a 5-L four-necked flask were introduced 252 g of α-(3,3-diethoxypropyl)-,ω-hydroxy-polyoxyethylene (molecular weight, 10,000; diol, 3.13%) and 3,753 g of toluene. A Three-One Motor, a condenser, a water measuring tube, and a nitrogen bubbling tube were attached thereto. The contents were heated to 110° C. using a mantle heater, and the water contained was allowed to form an azeotrope with toluene. Refluxing dehydration was thus performed. After 100 g of the toluene was distilled off, the contents were cooled to 50° C. Five hundred grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. Hexane was added to the recovered filtrate to cause crystallization. The crystals precipitated were taken out by filtration and vacuum-dried, and a sample was recovered (116 g).

As a result of GPC analysis, the diol in the sample was N.D.

Example 4-1

Into a 10-L glass reaction vessel were introduced 121 g of α-(tert-butyl)-,ω-hydroxy-polyoxyethylene, which is shown by the following formula (b), (molecular weight, 40,000; diol content, 6.54%) and 6,000 g of toluene. A Three-One Motor, a condenser, and a nitrogen bubbling tube were attached thereto, and the polymer was dissolved at 55° C. using a mantle heater. Thereto was added 244 g of Kyoward 200B (Kyowa Chemical Industry). The resultant mixture was stirred at 55° C. for 1 hour. A Nutsche funnel with 5 A filter paper was prepared, and the mixture was subjected to suction filtration. The filtrate was recovered. Hexane was added to the recovered filtrate to cause crystallization. The crystals precipitated were taken out by filtration and vacuum-dried, and a sample was recovered (65 g).

As a result of GPC analysis, the sample was found to have a diol content of 1.05%.

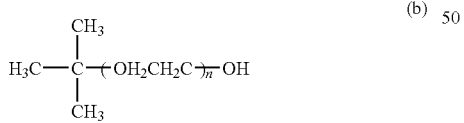

(b)

Example 4-2

Into a 10-L glass reaction vessel were introduced 202 g of α-(tert-butyl)-,ω-hydroxy-polyoxyethylene (molecular weight, 10,000; diol content, 2.99%) and 6,004 g of toluene. A Three-One Motor, a condenser, and a nitrogen bubbling tube were attached thereto, and the polymer was dissolved at 55° C. using a mantle heater. Thereto was added 244 g of Kyoward 200B (Kyowa Chemical Industry). The resultant mixture was stirred at 55° C. for 1 hour. A Nutsche funnel with 5 A filter paper was prepared, and the mixture was subjected to suction filtration. The filtrate was recovered. The filtrate recovered was concentrated to 1,200 g, and hexane was thereafter added thereto to cause crystallization. The crystals precipitated were taken out by filtration and vacuum-dried, and a sample was recovered (105.2 g).

As a result of GPC analysis, the sample was found to have a diol content of N.D.

Example 5

Into order to demonstrate purification in case B, a sample was prepared by adding methoxypolyethylene glycol having a molecular weight of 20,000 to a branched polyoxyethylene derivative shown by the following formula (c) which had two polyoxyethylene chains bonded to a glycerol framework (molecular weight, 40,000) (the content of the mPEG having molecular weight of 20,000 in the sample: 11.9%), and was subjected to purification. Into a 100-mL four-necked flask were introduced 2.25 g of the sample prepared and 40 g of toluene. A Three-One Motor, a condenser, and a nitrogen bubbling tube were attached thereto, and the sample was dissolved at 55° C. using a mantle heater. Five grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. Hexane was added to the recovered filtrate to cause crystallization. The crystals precipitated were taken out by filtration and dried, and a sample was recovered (1.22 g). As a result of GPC analysis, the content of the methoxypolyethylene glycol impurity having a molecular weight of 20,000 in this sample was found to be 9.1%. Furthermore, the operation was repeated. As a result, GPC analysis revealed that the content of the methoxypolyethylene glycol impurity having a molecular weight of 20,000 in the sample was able to be reduced to 5.1%.

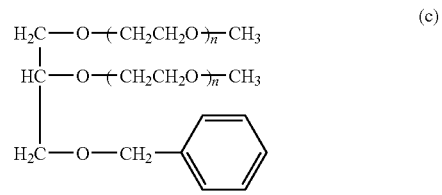

(c)

Example 6 and Comparative Example 2

In order to demonstrate the ability of the invention to remove diols regardless of molecular weight, an mPEG sample containing 3 to 4% diol having a molecular weight two times that of the main component and 3 to 4% diol having a molecular weight one-half the molecular weight of the main component was prepared and subjected to the treatment according to the invention. For the purpose of comparison, this sample was treated by the method described in patent document 5 (WO 2006/028745). Details thereof are shown below.

Into a 300-mL four-necked flask were introduced 10 g of the mPEG sample (molecular weight, 40,000; content of diol with molecular weight of 80,000, 2.98%; content of diol with molecular weight of 20,000, 3.91%) and 150 g of toluene. A Three-One Motor, a condenser, and a nitrogen bubbling tube were attached thereto, and the mPEG sample was dissolved at 55° C. using a mantle heater. Twenty grams of Kyoward 200B (Kyowa Chemical Industry) was added thereto, and the mixture was stirred at 55° C. for 1 hour. A Nutsche funnel with 5 A filter paper was prepared, and the mixture was subjected to suction filtration. The filtrate was recovered. Hexane was added to the recovered filtrate to cause crystallization. The crystals precipitated were taken out by filtration and vacuum-dried, and a sample A was recovered (5 g).

Into a 2-L four-necked flask were introduced 10 g of the mPEG sample (molecular weight, 40,000; content of diol with molecular weight of 80,000, 2.98%; content of diol with molecular weight of 20,000, 3.91%) and 1,000 g of ion-exchanged water. A Three-One Motor, a condenser, and a nitrogen bubbling tube were attached thereto, and the mPEG sample was dissolved at 60° C. using a mantle heater. Thirty grams of DOWEX (DOW Chemical Co.) (poly(acrylic acid) resin) was added thereto, and the mixture was stirred at 60° C. for 3 hours. A Nutsche funnel with 5 A filter paper was prepared, and the mixture was subjected to suction filtration. The filtrate was recovered. One kilogram of chloroform was added thereto to conduct extraction, and this operation was repeated twice. The chloroform layer was concentrated, and 200 g of ethyl acetate was thereafter added thereto to redissolve the concentrate. Ten grams of magnesium sulfate was added thereto to dehydrate the solution. A Nutsche funnel with 5 A filter paper was prepared, and the mixture was subjected to suction filtration. The filtrate was recovered. Hexane was added to the recovered filtrate to cause crystallization. The crystals precipitated were taken out by filtration and vacuum-dried, and a sample B was recovered (5 g).

The results thereof are shown in Table 12 and FIG. 1.

TABLE 12

|  | Before treatment | Sample A | Sample B |
|---|---|---|---|
| Diol (molecular weight, 80,000) (%) | 2.98 | 0.35 | 0.40 |
| mPEG (molecular weight, 40,000) (%) | 93.11 | 98.24 | 94.48 |
| Diol (molecular weight, 20,000) (%) | 3.91 | 1.41 | 5.12 |

As the results given above show, it was found that the method described in patent document 5 (WO 2006/028745) was substantially ineffective in removing the low-molecular-weight diol, although able to remove the high-molecular-weight diol. This prior-art method is not applicable when a low-molecular-weight diol impurity is contained. It was further found that in contrast thereto, the invention was able to simultaneously remove the diols regardless of the molecular weights thereof.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 31, 2009 (Application No. 2009-085124), the entire contents thereof being incorporated herein by reference. Furthermore, all references cited herein are incorporated herein as a whole.

The invention claimed is:

1. A purification method of polyoxyalkylene derivative, wherein an impurity is separated from a polyoxyalkylene derivative having a molecular weight of 8,800 to 100,000 represented by the following general formula [1], the impurity being different from the polyoxyalkylene derivative in the number of hydroxyl groups, the method comprising the following steps (A), (B), (C), and (D):

step (A): a step in which an aprotic organic solvent is used in an amount at least 5 times by weight the amount of the polyoxyalkylene derivative to dissolve the polyoxyalkylene derivative to give a solution of the polyoxyalkylene derivative;

step (B): a step in which an inorganic adsorbent comprising an oxide containing at least one of aluminum and silicon is added to the solution in an amount 0.5 to 5 times by weight the amount of the polyoxyalkylene derivative to produce a slurry;

step (C): a step in which the slurry is stirred at 25° C. or higher; and step (D): a step in which the polyoxyalkylene derivative is recovered from the slurry:

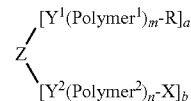

$$Z \begin{matrix} [Y^1(\text{Polymer}^1)_m\text{-R}]_a \\ \\ [Y^2(\text{Polymer}^2)_n\text{-X}]_b \end{matrix} \quad [1]$$

wherein

Z is a residue of a compound having 2 to 8 active hydrogen atoms;

$Y^1$ and $Y^2$ represent an ether bond, a thioether bond, an ester bond, a urethane bond, an amide bond, a carbonate bond, a secondary amino group, or an alkylene group containing any of these;

Polymer$^1$ and Polymer$^2$ represent a linear or branched polyoxyalkylene chain comprised of oxyalkylene group having 2 to 4 carbon atoms;

R represents a hydrocarbon group having 1 to 7 carbon atoms or an acetal group having 3 to 9 carbon atoms;

X represents an amino group, a protected amino group, a protected carboxyl group, an aldehyde group, a protected aldehyde group, a hydroxyl group, a protected hydroxyl group, a thiol group, a protected thiol group, a sulfonyl group, a vinyl group, an allyl group, a cyano group, or an alkylene group containing any of these, or a hydrogen atom;

m and n are such that m=1 or 0, n=1 or 0, and $1 \leq m+n$;

a and b are integers satisfying $0 \leq a \leq 8$, $0 \leq b \leq 8$, and $2 \leq a+b \leq 8$; and when a and b are integers of 2 or larger, $Y^1$ and $Y^2$, Polymer$^1$ and Polymer$^2$, R, X, m, and n may be the same or different in the molecule.

2. The purification method of polyoxyalkylene derivative according to claim 1, wherein in the step (D), the slurry is filtered and thereafter the polyoxyalkylene derivative is recovered from the filtrate.

3. The purification method of polyoxyalkylene derivative according to claim 2, wherein in the general formula [1], Z is the residue formed by removing the hydroxyl groups from ethylene glycol; $Y^1$ and $Y^2$ are an ether bond; Polymer$^1$ is a linear polyoxyethylene chain; R is a hydrocarbon group having 1 to 7 carbon atoms or an acetal group having 3 to 9 carbon atoms; X is a hydrogen atom; m and n respectively are m=1 and n=0; and a and b respectively are a=1 and b=1.

4. The purification method of polyoxyalkylene derivative according to claim 3, wherein in the general formula [1], R is a methyl group.

5. The purification method of polyoxyalkylene derivative according to claim 2, wherein in the general formula [1], Z is a residue of a polyhydric alcohol or of an amino acid or peptide; $Y^1$ and $Y^2$ are an ether bond, a thioether bond, an ester bond, a urethane bond, an amide bond, a carbonate bond, a secondary amino group, or an alkylene group containing any of these; Polymer$^1$ and Polymer$^2$ are a linear or branched polyoxyethylene chain; R is a hydrocarbon group having 1 to 7 carbon atoms or an acetal group having 3 to 9 carbon atoms; X is a protected amino group, a protected carboxyl group, a protected aldehyde group, a protected hydroxyl group, a protected thiol group, a cyano group, or an alkylene group containing any of these; m and n respectively are m=1 or 0 and n=1; a and b respectively are integers satisfying $0 \leq a \leq 8$, $0 \leq b \leq 8$, and $2 \leq a+b \leq 8$; and when a and b are integers of 2 or larger, then Y$^1$ and Y$^2$, Polymer$^1$ and Polymer$^2$, R, X, m, and n may be the same or different in the molecule.

6. The purification method of polyoxyalkylene derivative according to claim 2, wherein in the general formula [1], Z is the residue formed by removing the hydroxyl groups from a polyhydric alcohol; Y$^1$ and Y$^2$ are an ether bond; Polymer$^1$ and Polymer$^2$ are a linear or branched polyoxyethylene chain; R is a hydrocarbon group having 1 to 7 carbon atoms or an acetal group having 3 to 9 carbon atoms; X is a protected amino group, a protected carboxyl group, a protected aldehyde group, a protected hydroxyl group, a protected thiol group, a cyano group, or an alkylene group containing any of these; m and n each are 1 or 0 and $1 \leq m+n$; a and b respectively are integers satisfying $0 \leq a \leq 8$, $0 \leq b \leq 8$, and $2 \leq a+b \leq 8$; and when a and b are integers of 2 or larger, then Y$^1$ and Y$^2$, Polymer$^1$ and Polymer$^2$, R, X, and m may be the same or different in the molecule.

7. The purification method of polyoxyalkylene derivative according to claim 1, wherein in the step (D), the slurry solution is filtered and thereafter the polyoxyalkylene derivative is recovered from the filter cake.

8. The purification method of polyoxyalkylene derivative according to claim 7, wherein in the polyoxyalkylene derivative represented by the general formula [1], Z is the residue formed by removing the hydroxyl groups from a polyhydric alcohol; Y$^1$ and Y$^2$ are an ether bond; Polymer$^2$ is a linear or branched polyoxyethylene chain; R is a hydrocarbon group having 1 to 7 carbon atoms or an acetal group having 3 to 9 carbon atoms; X is a hydrogen atom; m and n respectively are m=0 and n=1; a and b respectively are integers satisfying a=0 or 1, $2 \leq b \leq 8$, and $3 \leq a+b \leq 8$; and when b is an integer of 2 or larger, then Polymer$^2$ and X may be the same or different in the molecule.

9. The purification method of polyoxyalkylene derivative according to claim 7, wherein in the general formula [1], Z is a residue of a polyhydric alcohol, amino acid, or peptide; Y$^1$ and Y$^2$ are an ether bond, an amide bond, an ester bond, a carbonate bond, a secondary amino group, or an alkylene group containing any of these; Polymer$^1$ and Polymer$^2$ are a linear or branched polyoxyethylene chain; R is a hydrocarbon group having 1 to 7 carbon atoms or an acetal group having 3 to 9 carbon atoms; X is an amino group, a protected amino group, a protected carboxyl group, an aldehyde group, a protected aldehyde group, a hydroxyl group, a protected hydroxyl group, a thiol group, a protected thiol group, a cyano group, or an alkylene group containing any of these, or a hydrogen atom; m and n respectively are such that m=1 or 0, n=1 or 0, and $1 \leq m+n$; a and b respectively are integers satisfying $0 \leq a \leq 8$, $0 \leq b \leq 8$, and $2 \leq a+b \leq 8$; and when a and b are integers of 2 or larger, then Y$^1$ and Y$^2$, Polymer$^1$ and Polymer$^2$, R, X, m, and n may be the same or different in the molecule.

10. The purification method of polyoxyalkylene derivative according to claim 1, wherein the polyoxyalkylene derivative represented by the general formula [1] has a molecular weight of 10,000 or higher.

11. The purification method of polyoxyalkylene derivative according to claim 10, wherein the polyoxyalkylene derivative represented by the general formula [1] has a molecular weight of 30,000 or higher.

12. The purification method of polyoxyalkylene derivative according to claim 1, wherein the inorganic adsorbent comprises at least one of aluminum oxide and silicon oxide as a component.

13. The purification method of polyoxyalkylene derivative according to claim 1, wherein the amount of the adsorbent is 1 to 3 times by weight the amount of the polyoxyalkylene derivative.

14. The purification method of polyoxyalkylene derivative according to claim 1, wherein the aprotic solvent is one or more members selected from the group consisting of toluene, xylene, benzene, ethyl acetate, butyl acetate, chloroform, dichloromethane, acetone, acetonitrile, and tetrahydrofuran.

15. The purification method of polyoxyalkylene derivative according to claim 14, wherein the aprotic solvent is toluene.

16. The purification method of polyoxyalkylene derivative according to claim 1, wherein the amount of the aprotic solvent is 10 to 20 times by weight the amount of the polyoxyalkylene derivative.

* * * * *